(12) United States Patent
Park et al.

(10) Patent No.: US 6,901,508 B2
(45) Date of Patent: May 31, 2005

(54) METHOD FOR EXPANDING ADDRESS FOR INTERNET PROTOCOL VERSION 4 IN INTERNET EDGE ROUTER

(75) Inventors: Chang-Min Park, Taejon (KR); Mi-Ryong Park, Taejon (KR); Jong-Hyup Lee, Taejon (KR); Hyeong-Ho Lee, Taejon (KR); Sang-Ha Kim, Taejon (KR)

(73) Assignee: Electronics and Telecommunication Research Institute, Taejon (KR)

( * ) Notice: Subject to any disclaimer, the term of this patent is extended or adjusted under 35 U.S.C. 154(b) by 864 days.

(21) Appl. No.: 09/726,571

(22) Filed: Dec. 1, 2000

(65) Prior Publication Data

US 2001/0010079 A1 Jul. 26, 2001

(30) Foreign Application Priority Data

Jan. 20, 2000 (KR) .......................................... 2000-2704

(51) Int. Cl.[7] .............................................. H04L 9/00
(52) U.S. Cl. ...................... 713/153; 709/220; 709/223; 370/389
(58) Field of Search ................................ 713/201, 151, 713/153; 709/200, 220, 223, 238, 242, 243, 249; 370/331, 389, 395, 401, 466, 416; 395/182, 200; 455/436, 560

(56) References Cited

U.S. PATENT DOCUMENTS 5,881,239 A * 3/1999 Desgrousilliers ............ 709/226
6,026,441 A    2/2000 Ronen
6,185,612 B1 * 2/2001 Jensen et al. ................ 709/223
6,269,099 B1 * 7/2001 Borella et al. .............. 370/389
6,473,411 B1 * 10/2002 Kumaki et al. ............. 370/331

* cited by examiner

Primary Examiner—Gregory Morse
Assistant Examiner—Ellen C Tran
(74) Attorney, Agent, or Firm—Mayer, Brown, Rowe & Maw LLP (57) ABSTRACT

In the method for expanding an address for an Internet protocol in an Internet edge router and the record medium capable of being read through a computer having a record of a program to realize the inventive method, an address expanding system of IPv4 used by incorporating public network connection information in an IPv4 address is utilized, thereby, all services of the existing IPv4 can be accepted and an enlargement to a new service can be valid. That is, in such Internet edge router, the inventive method comprises the steps of defining public network connection information in an option class of an Internet protocol message; b) constructing a security & authentication (SA) module and an SA hierarchical protocol in a service terminal protocol in order to provide IP address information and a user authentication from a server having information of the existing public network subscribers by using the public network connection information, and constructing a connection information processing part to process the public network connection information; and c) receiving a message from a network interface and processing it, in the connection information processing part, whereby being applied to an Internet service system.

4 Claims, 10 Drawing Sheets

| E.164 ADDRESS /701 | TEI /702 | LINK IDENTIFIER /703 |
|---|---|---|
| XXXXXXXXXXXXXX | XX | DLCI (IN CASE OF FRAME RELAY) |
| YYYYYYYYYYYYYY | YY | VPI/VCI (IN CASE OF ATM) |

FIG. 8

METHOD FOR EXPANDING ADDRESS FOR INTERNET PROTOCOL VERSION 4 IN INTERNET EDGE ROUTER

FIELD OF THE INVENTION

The present invention relates to a method for expanding an address for an Internet protocol in an Internet edge router; and, more particularly, to a method for expanding an address for an Internet protocol in an Internet edge router without a constraint upon an Internet service on the basis of an address designating method for an Internet protocol version 4 (IPv4), and to a record medium capable of being read through a computer having a record of a program to realize the inventive method.

PRIOR ART OF THE INVENTION

In a general Internet protocol address designating method, it is employed an IPv4 address designating method having an address area of 4 byte recommended in RFC791 as the Internet protocol. At these days, an Internet service using an air network is continuously getting increased. In order to support a data communication in a mobile communication such as an IMT2000, a service for Internet subscribers being continuously increased worldwide cannot be completely supplied only by a 4 byte address designating method recommended by the IPv4.

Therefore, in order to settle such shortage of the address, a classless inter domain routing (CIDR) method is being used, in which a details class definition is introduced for the sake of an efficient use of the Internet address, but this CIDR method makes a routing table complicated. Further, various kinds of technique is being used, e.g., a network address transition (NAT) method which uses an independent address system in a sub network, and a dynamic host configuration protocol (DHCP) which uses a dynamic allocation system of an IP address in such a way that an IPv4 address is dynamically allocated to a service terminal connected terminal-to-terminal like a telephone line. However, it can not be guaranteed that the IPv4 address same as the previously allocated address will be allocated when re-connecting by a cut-off of a signal.

The IP address having a new address system as an IPv6, which is provided to fundamentally settle the above-mentioned conventional problems, has an address designation area of 16 bytes, to thereby ensure an address area capable of sufficiently accepting all services in comparison with the IPv4 address of 4 bytes. However, in such IP address, a router that constructs the existing Internet, should be replaced with another, furthermore, an Internet service network as a private network which is generable and is available to disappear in itself has a problem, that is, a serious influence owing to a communication interruption caused by a replacement of the router.

SUMMARY OF THE INVENTION

Therefore, it is an object of the present invention to provide a method for expanding an address for an Internet protocol in an Internet edge router and a record medium capable of being read through a computer having a record of a program to realize the inventive method, in which all services based on the existing IPv4 can be accepted and an enlargement to a newly service-can be provided, by using an address expansion method of IPv4 which is usable by incorporating public network connection information in the IPv4 address.

To achieve these and other advantages, and in accordance with the purpose of the present invention, the method for expanding an address for an Internet protocol in an Internet edge router comprises the steps of: a) defining public network connection information in an option class of an Internet protocol message; b) constructing a security & authentication ("SA") module and an SA hierarchical protocol in a service terminal protocol in order to provide IP address information and a user authentication from a server having information of the existing public network subscribers by using the public network connection information, and also constructing a connection information processing part to process the public network connection information; and c) receiving a message from a network interface and processing it in the connection information processing part.

In accordance with the present invention, further, it is provided in an Internet edge router having a microprocessor the record medium capable of being read through a computer having a record of a program to realize a first function of defining public network connection information in an option class of an Internet protocol message; a second function of constructing a security & authentication ("SA") module and an SA hierarchical protocol in a service terminal protocol in order to provide IP address information and a user authentication from a server having information of the existing public network subscribers by using the public network connection information, and also constructing a connection information processing part to process the public network connection information; and a third function of receiving a message from a-network interface and processing it in the connection information processing part.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1:
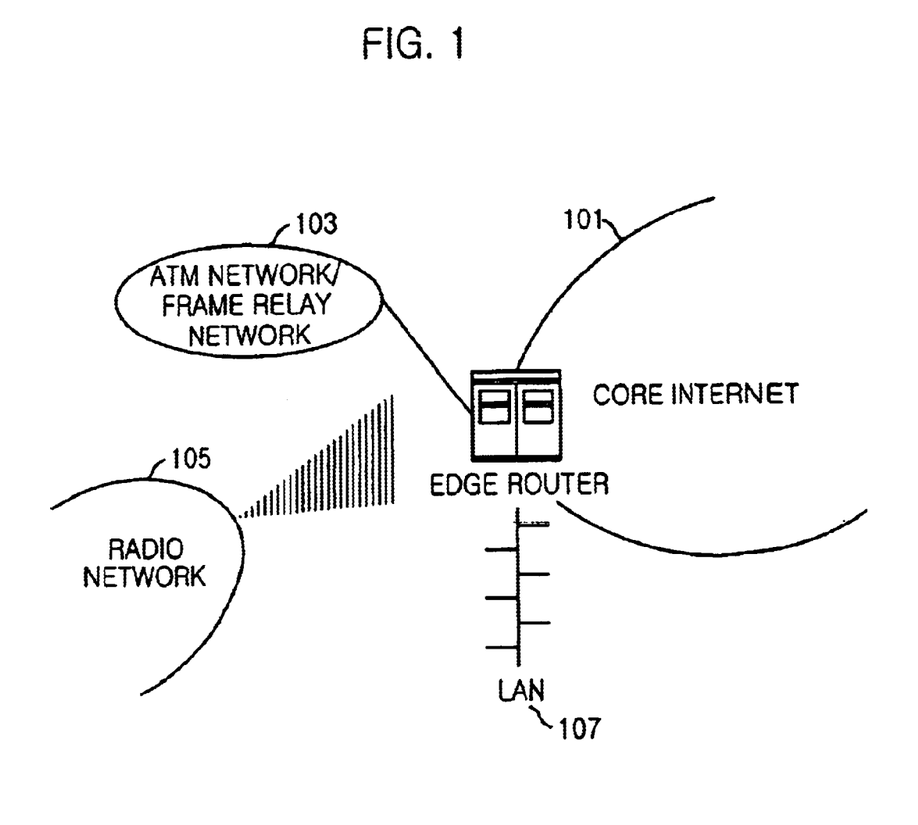
FIG. 1 represents a constructive diagram for one embodiment of an Internet service system in accordance with the present invention.

FIG. 1 is a constructive diagram for one embodiment of an Internet service system in the present invention.

As shown in FIG. 1, an inventive Internet service system is made up of a wire ATM network/frame relay network 103 based on an E.164 address system and an ATM end system address (AESA), as an access network requiring an Internet service; a radio network 105 requiring a service passing through the same public network and a hand-off process like a mobile IP; an edge router 14 for connecting with Internet services passing through a LAN 107 as the existing Internet; and a core Internet 10 interlocked through a use of the respective access networks, individually different link protocols and connection numbers.

Figure 2:
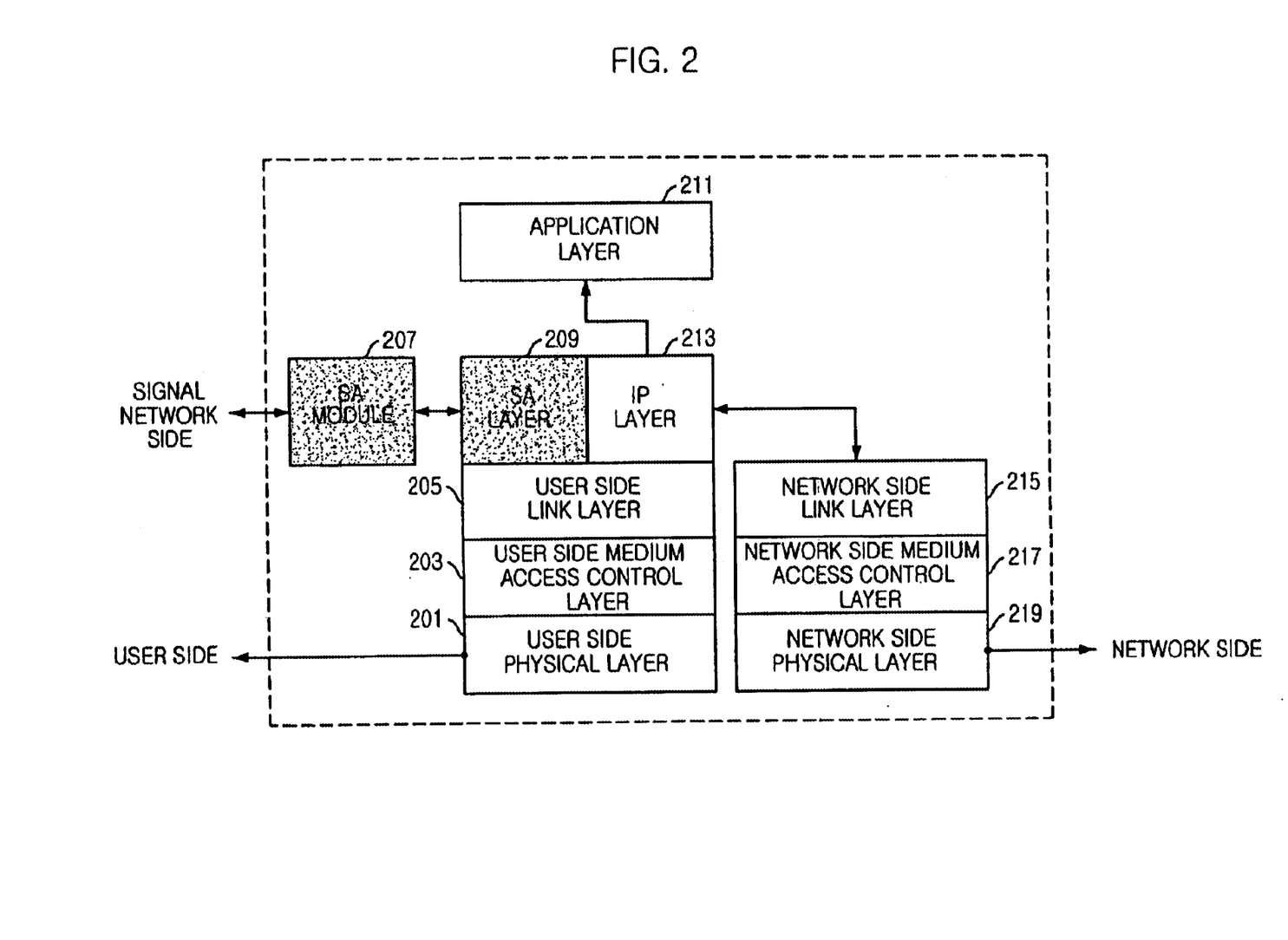
FIG. 2 indicates a block diagram for one embodiment of an edge router protocol for an Internet service in the present invention.

FIG. 2 is a block diagram for one embodiment of an edge router protocol for an Internet service in the invention.

A user side physical layer 201 provided individually differently according to a characteristic of the access network and a user side medium control layer 203 are constructed differently according to a sort of the access networks. Meantime, a data traffic from mutually different access networks should be based on the same Internet protocol (IP) layer 213, network side link layer 215, network side medium control layer 217 and network side physical layer 30 in order for a connection to the core Internet 101.

Herewith, there additionally are provided an SA layer protocol 209 and an SA module (Security & Authentication module) 207 for providing IP address information and a user authentication from a server having information of the existing public network subscribers by using the public network subscriber information.

Figure 3:
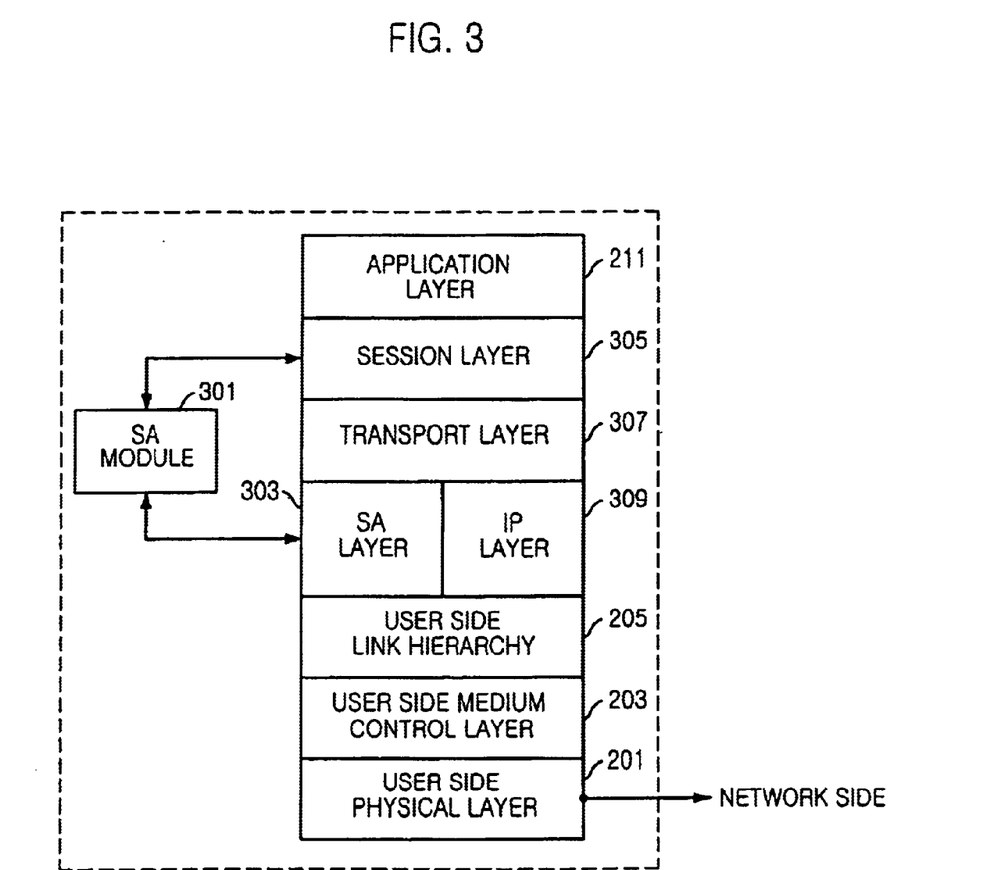
FIG. 3 depicts a block diagram for one embodiment of a service terminal protocol for an Internet service in the invention.

FIG. 3 is a block diagram for one embodiment of a service terminal protocol for an Internet service in the invention.

In order to start a service, a session layer 305 acquires its own IP address information from a user information server through an edge router by using the SA module 301 and the SA layer protocol 303, and determines its own IP address.

Then, it is performed a work of determining connection information among the SA module 301 and the SA layer protocol 303, and the session layer 305.

After the determination of its own IP address, the service is executed by determining a terminal-to-terminal connection through a protocol of a transport layer, 307. At this time, for a protocol of an IP layer 309, the same protocol as the IP layer 213 shown in FIG. 2 is provided thereon.

Figure 4:
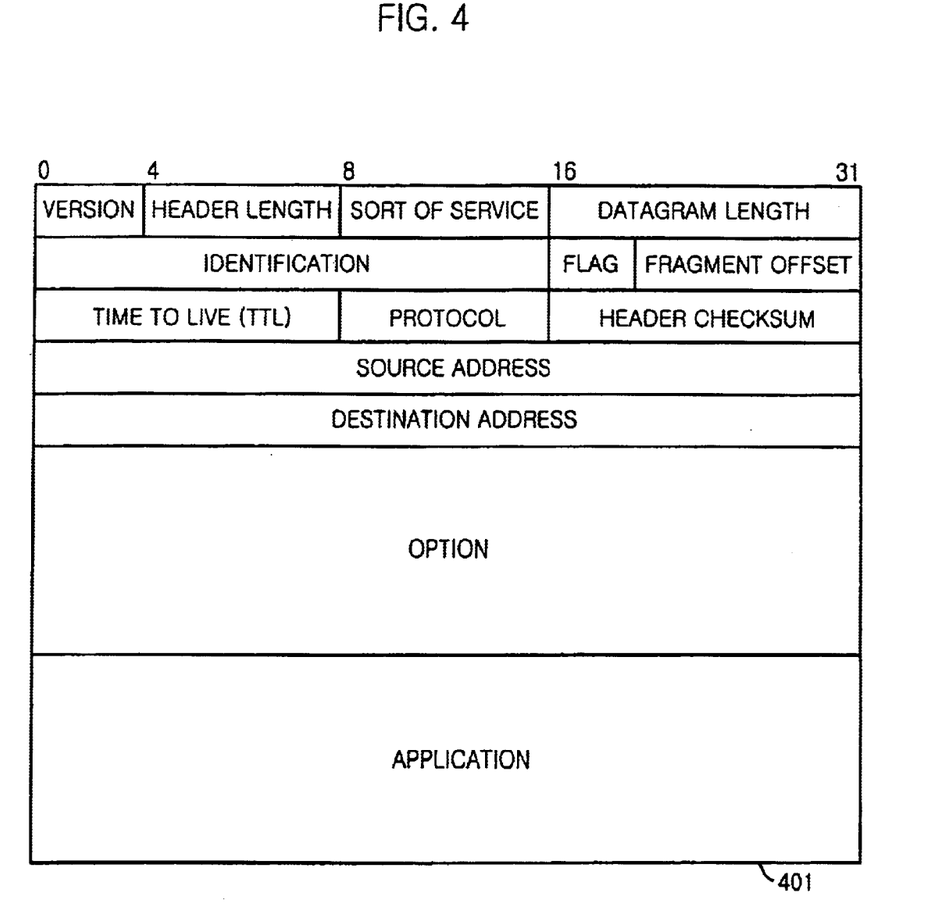
FIG. 4 is a constructive diagram-showing one embodiment of a protocol message format for an Internet protocol version 4 in the invention.

FIG. 4 is a constructive diagram showing one embodiment of a protocol message format for an Internet protocol version 4. This construction is same as the protocol message format of the well-known Internet protocol version 4, thus its detailed description will be omitted herein.

Figure 5:
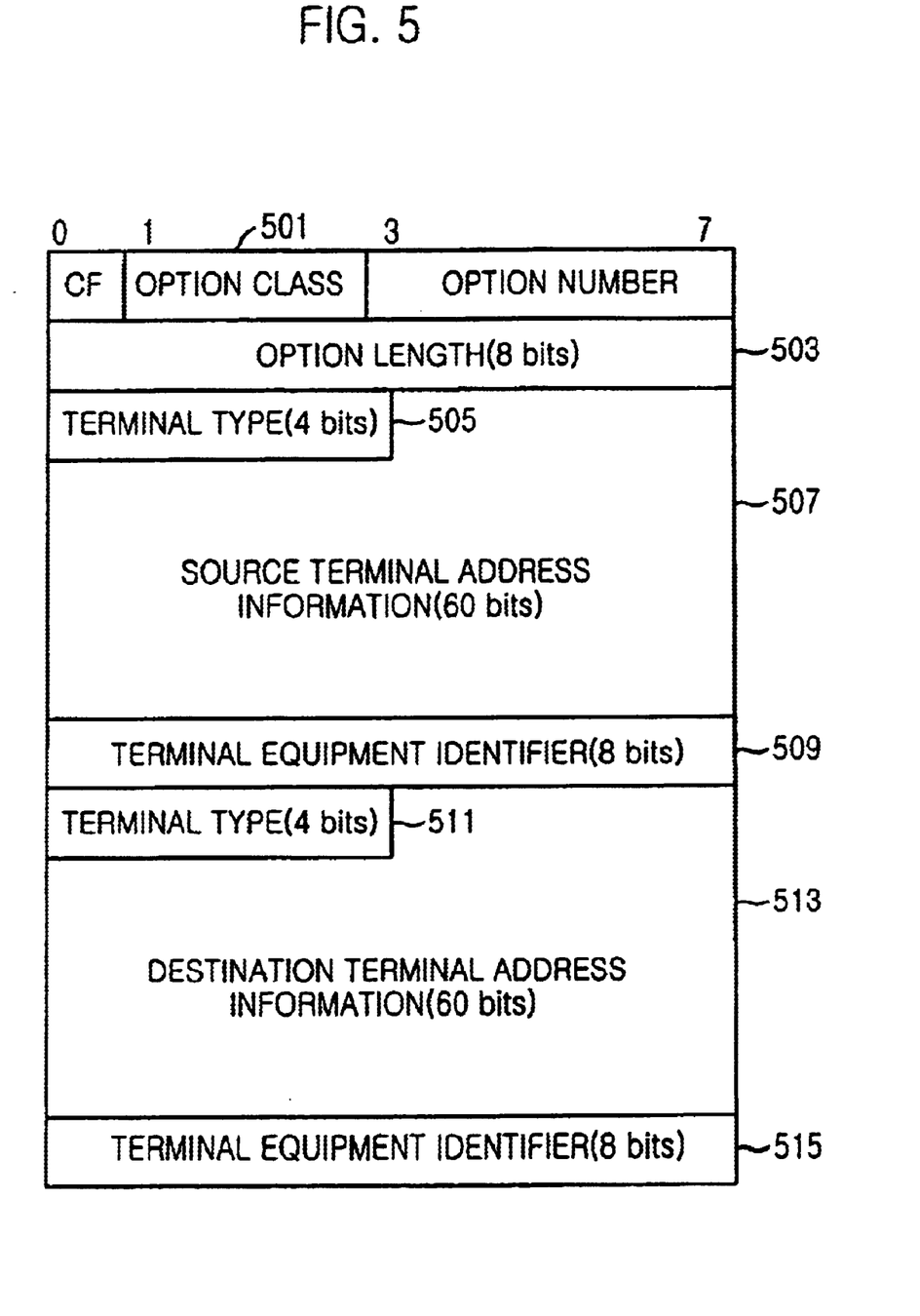
FIG. 5 is a constructive diagram showing one embodiment of an option field format for an Internet protocol version 4 in the invention.

FIG. 5 is a constructive diagram showing one embodiment of an option area for an address expansion of an Internet protocol version 4, and indicates a data structure newly defined for an unused portion of a variable length option in an option area 401 shown in FIG. 4.

Two new information elements as the public network connection information, namely, a transmitting side terminal address and a receiving side terminal address, are defined on an option class in an option control field as a first octet, and an actual terminal address as a length represented in option length information is in a data field then transmitted.

Figure 6:
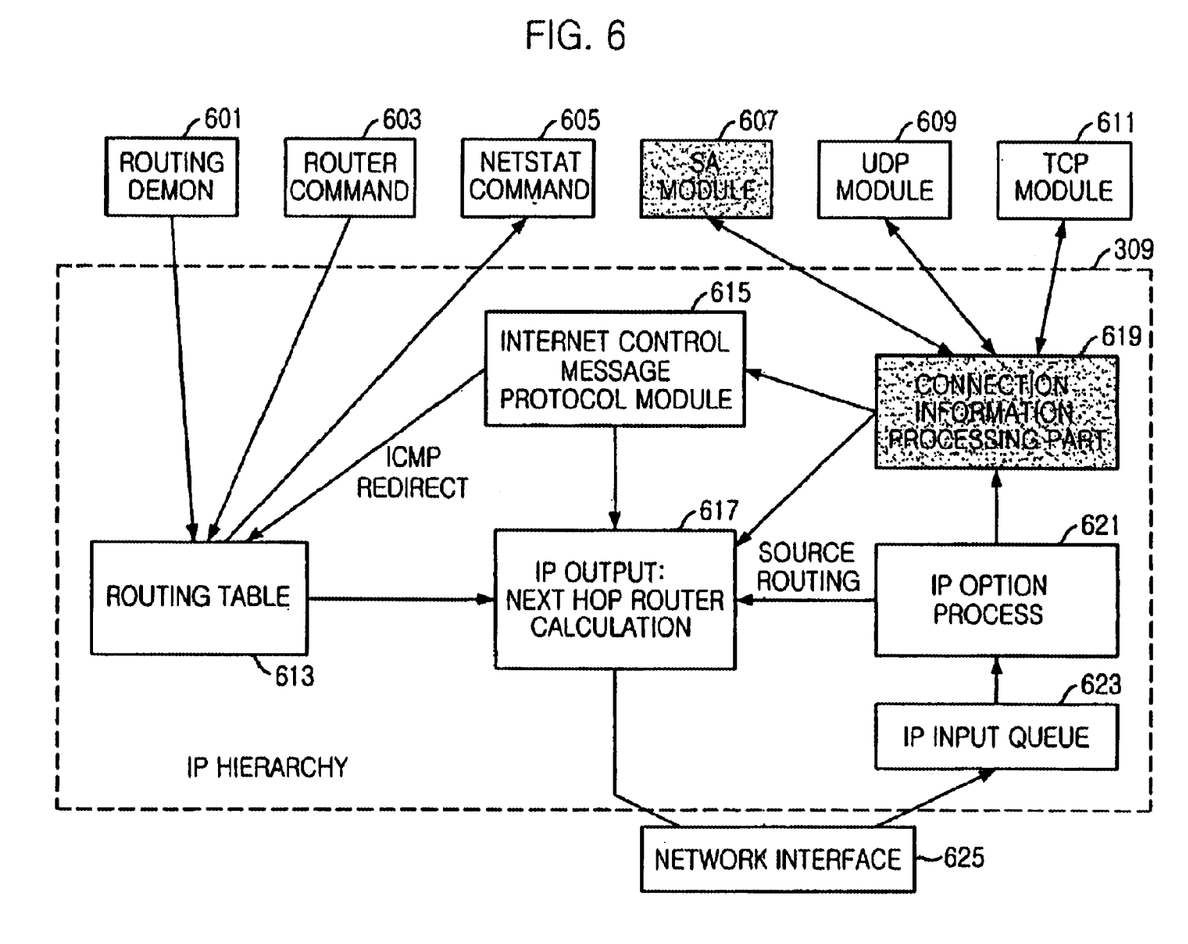
FIG. 6 is an explanatory diagram of one embodiment in a method for expanding an address for an Internet protocol in an Internet edge router in the present invention.

FIG. 6 is an explanatory diagram of one embodiment in a method for expanding an address for an Internet protocol in an Internet edge router in the present invention, and represents a packet processing method provided in the IP layers 213, 309 which are shown FIGS. 2 and 3. Herewith it is additionally provided a connection information processing part and an SA module to additionally process public network subscriber numbers.

A packet from a network interface 50 as a link layer is first received to an IP input queue 623, to process a source routing based on an IP option processing function. When it is an unconcerned packet, the packet is transmitted to a connection information processing part 619 to transmit it to a user datagram protocol (UDP) module 609 and a transport control protocol (TCP) module 611 according to a sort of packets. An IP output 617, an Internet control message protocol module 615, a routing demon 601, a netstat command 605 and a router command 603, to change information of a routing table 613, and its procedures are same as a well-known process procedure for changing routing table information.

Figure 7:
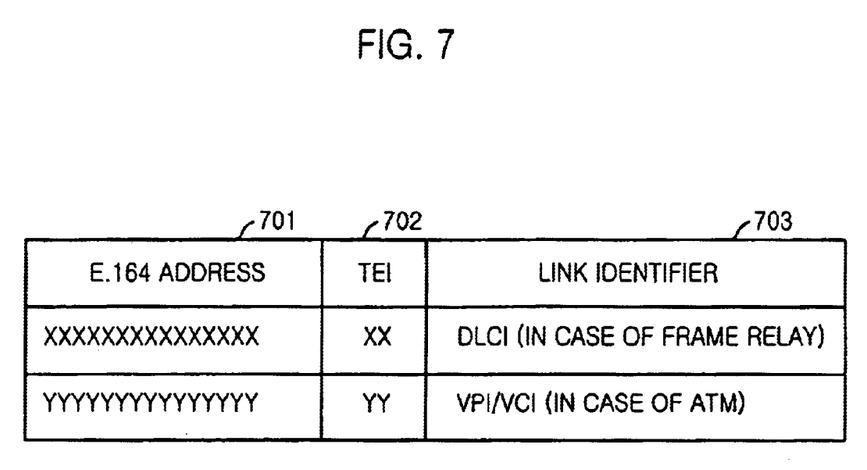
FIG. 7 is a diagram illustrating a link address table having link information between a service terminal and an access router.

FIG. 7 is a diagram illustrating a link address table having link information between a service terminal and an access router.

The link address table includes an E.164 address field 701, a TEI field 702 and a link identifier field 703. In the E.164 address field 701, an E.164 address of a terminal connected to the access network is registered. The link identifier of the IP packet, which is received through the Internet, is provided based on E.164 address of the terminal. If multiple terminals are connected to an access number, transmission data having the TEI so that the terminal can recognize that the data is to be transmitted. The link address table is made at the terminal's start up in accordance with a setup process between the terminal and the access router. In case of a mobile communication environment, the link address table is made by a mobile IP protocol at a handoff.

Figure 8:
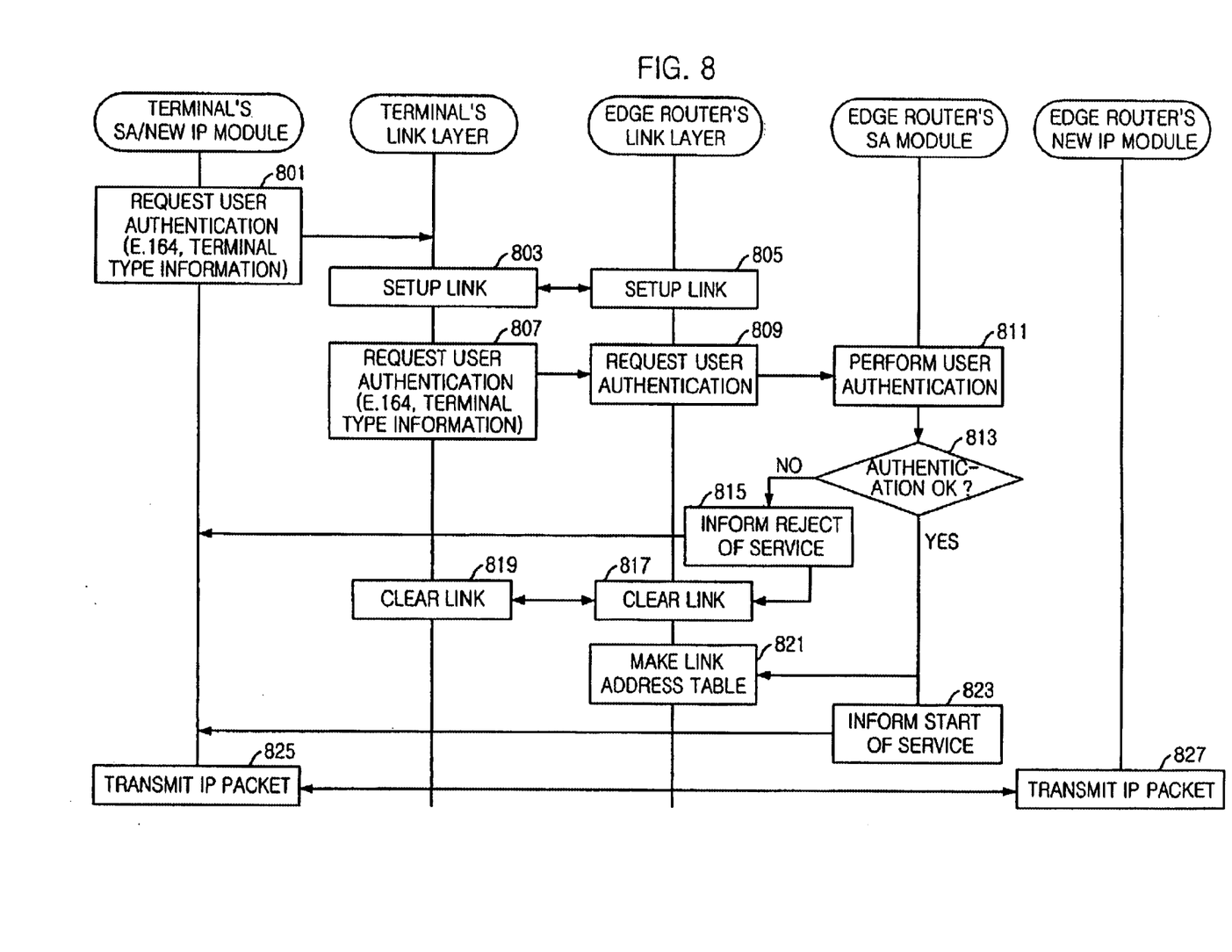
FIG. 8 is a flow chart of a method for making the link address table of FIG. 7 and a procedure for processing a packet transmission by using the same when a terminal transmits IP packet.

FIG. 8 is a flow chart of a method for making the link address table of FIG. 7 and a procedure for processing a packet transmission by using the same when a terminal transmits IP packet.

First, a terminal transmits information, such as E.164 address and kinds of terminal, to a SA module of an edge router for registering its information at step 801, 809 or 811. The SA module of edge router sets a link for performing the authentication of the terminal from information DB at step 803 or 805. If it is not an identified user's terminal, it informs a terminal at step 815 and then cancels a link at steps 817 and 819. However, if it is an identified user's terminal, it registers its information on the information table as shown in FIG. 7 at step 821. Then, if it informs a terminal of service start information, IP packet transmission service is performed at step 825.

Figure 9:
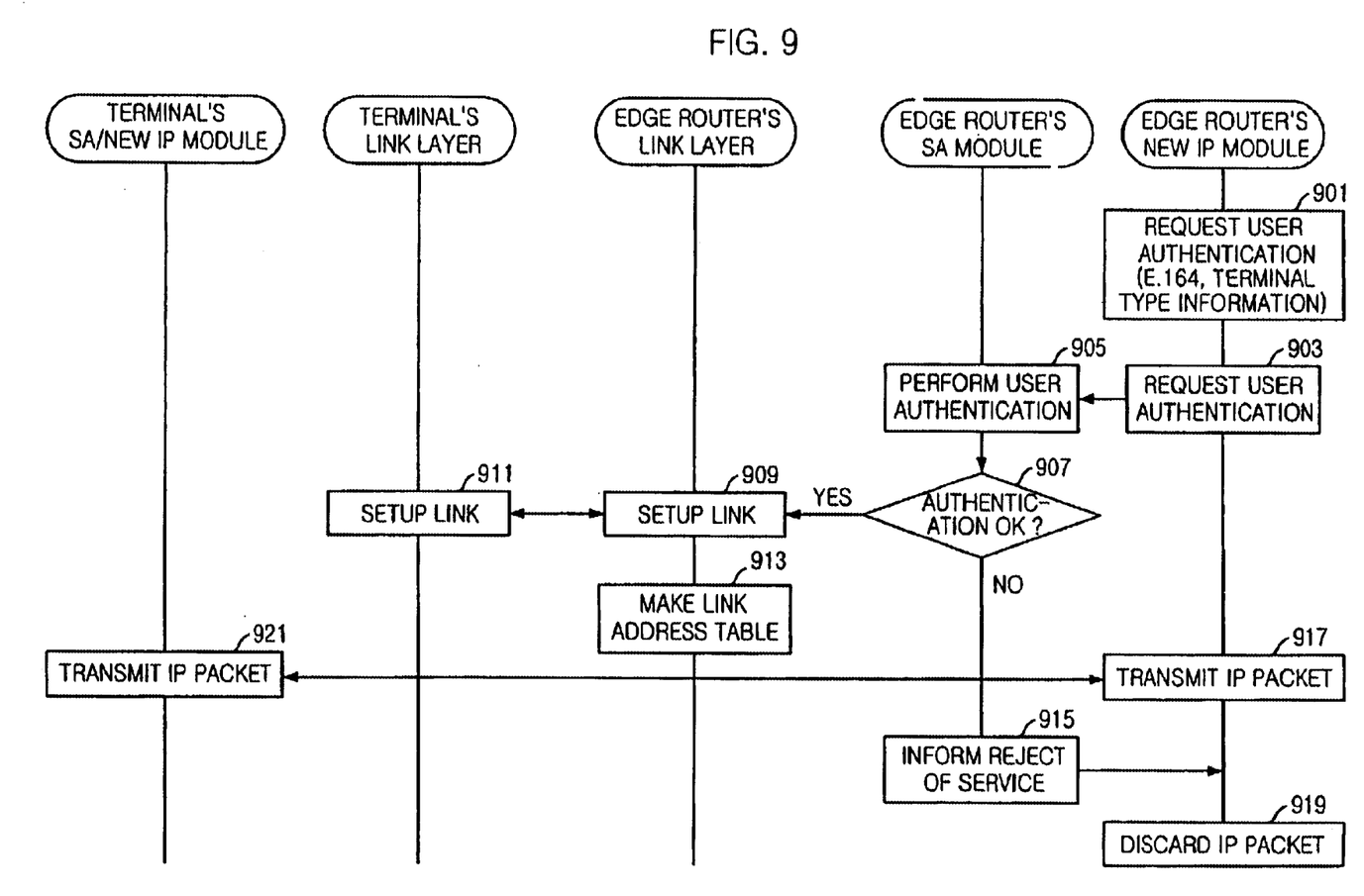
FIG. 9 is a flow chart showing a procedure for transmitting it to the user's terminal of access network when IP packet is received from the Internet network to the edge router.

FIG. 9 is a flow chart showing a procedure for transmitting it to the user's terminal of access network when IP packet is received from the Internet network to the edge router. When IP packet is received from the internet and if the destination address of IP is identified with that of edge, it requests the authentication of user's terminal to SA module of edge router with finding out the information of the address of destination E.164 and kinds of terminal in the option domain of IP packet at step 901. After authenticating at step 907, it establishes a link connection between the user's terminal and the edge router through access network at step 909 and 911, it transmits IP packet to the terminal by a set of link information. If it cannot identify, the interruption of service is informed and it disuses a received IP packet.

Figure 10:
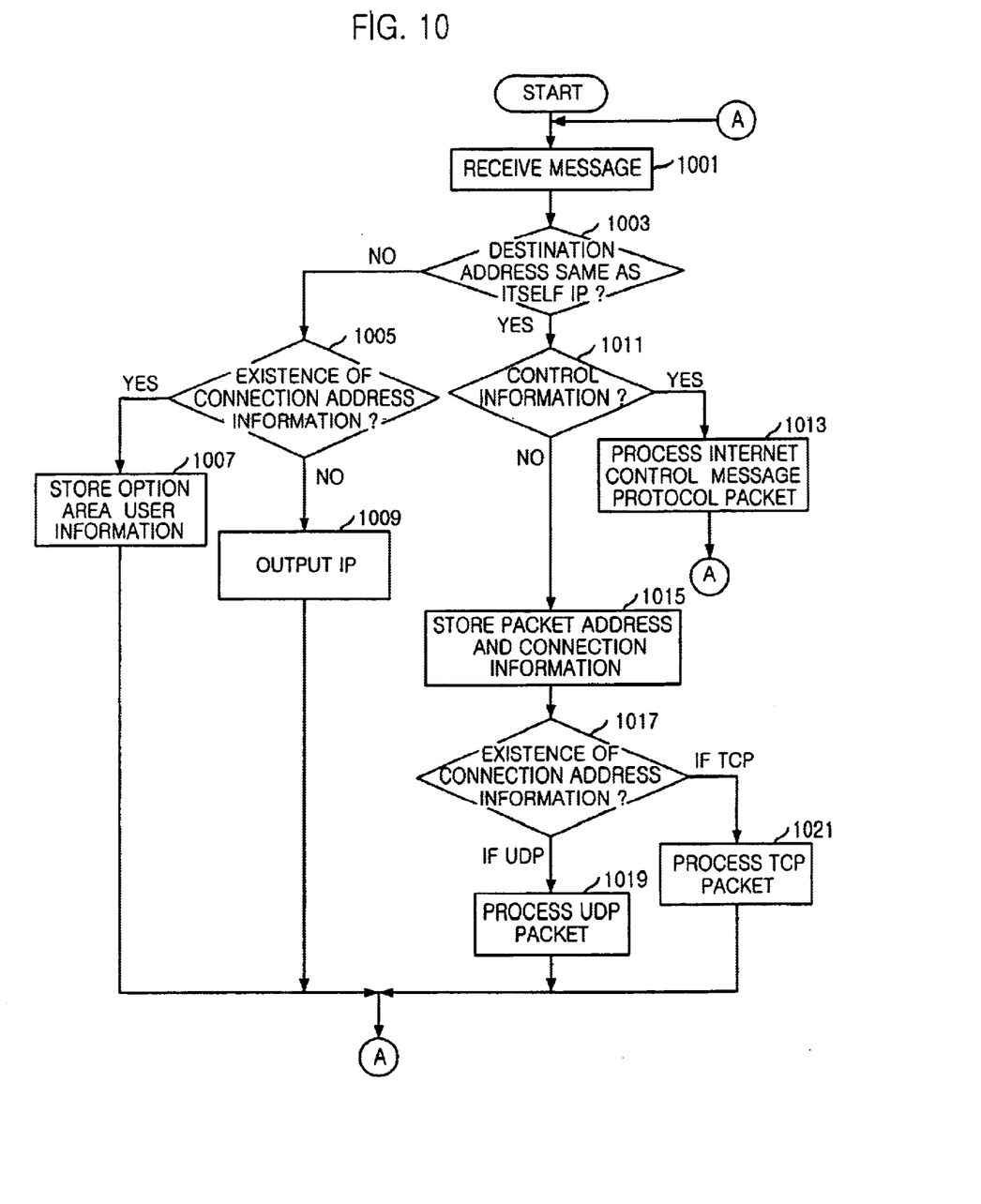
FIG. 10 is a flow chart of one embodiment for a method of expanding an address for an Internet protocol in an Internet edge router in accordance with the present invention.

FIG. 10 is a flow chart of one embodiment for a method of expanding an address for an Internet protocol in an Internet edge router.

As shown in FIG. 10, a message from the network interface 625 is first received in a step 1001, then is stored in the IP input queue 623. After processing an IP option, the connection information processing part 619 decides in a step 1003 whether or not a destination address of the message is same as its own IP.

If the destination address is not same as the its own IP in the deciding result in the step 1003, it is checked in a step 1005 whether connection address information as the terminal address exists within the routing table 613.

If the connection address information exists in the checking result 104, option area user information is stored in the option field 401 in a step 1007, after that, a step 1001 of receiving the message is performed, and if there does not exist the connection address information, the IP is outputted in a step 1009.

If the destination address is same as its own IP in the deciding result of the step 1003, it is checked in a step 110 whether there exists control information.

If the control information exists in the checking result of the step 1011, an Internet control message protocol packet is processed in the Internet control message protocol module 615 in a step 112, and the step 1001 of receiving the message is executed. If there does not exist the control information, in other words, if it is the data packet, a packet address and connection information such as a transmission/reception IP address, port information of a transmission/reception transport layer and a transmission/reception terminal address etc. are stored in a step 1015, then, a packet type is decided in a step 1017. At this time, the stored packet address and connection information are used as message header information in a transmission message.

If the packet type is the UDP in the deciding result of the step 1017, it is processed in a UDP packet in a step 1019, and then, the step 1001 of receiving the message is performed. If the packet type is the TCP, it is processed in a TCP packet in a step 1021, and the step 1001 of receiving the message is then executed.

As afore-mentioned, in accordance with the present invention, there is an effect not only for settling a problem such as an address shortage of an IPv4 for supporting an Internet service passing through a public network, but also for completely providing an Internet service like an Internet service supporting, by incorporating the existing IPv4 address system in public network connection information, without influencing upon the existing Internet interior and a necessity for replacing an IPv4 router equipment with another.

It will be apparent to those skilled in the art that various modifications and variations can be made in the present invention without deviating from the spirit or scope of the invention. Thus, it is intended that the present invention cover the modifications and variations of this invention provided they come within the scope of the appended claims and their equivalents.

What is claimed is:

1. A method for expanding an address for an Internet protocol in an Internet edge router, comprising the steps of:
   a) defining public network connection information in an option class of an Internet protocol message;
   b) constructing a security & authentication (hereinafter, referred to as "SA") module and an SA hierarchical protocol in a service terminal protocol in order to provide IP address information and a user authentication from a server having information of the existing public network subscribers by using the public network connection information, and constructing a connection information processing part to process the public network connection information; and
   c) receiving a message from a network interface and processing it, in the connection information processing part.

2. The method as recited in claim 1, wherein the public network connection information is a transmitting side terminal address and a receiving side terminal address.

3. The method as recited in claim 1, wherein said step c) includes:
   c1) receiving the message from the network interface and storing it in an IP input queue;
   c2) deciding by said connection information processing part whether or not a destination address of the received message is same as its own IP;
   c3) clarifying whether or not connection address information as the terminal address exists within a routing table if the destination address is not same as its own IP in the deciding result of said step c2), and storing option area user information if there exists the connection address information, and outputting an IP if there does not exist the connection address information;
   c4) confirming whether or not there exists the control information if the destination address is same as its own IP in the deciding result of said fifth step, and processing an Internet control message protocol packet if there exists the control information, and storing packet address and connection information if it is a data packet, and then deciding a type of the packet; and
   c5) processing a UDP packet if the type of the packet is a UDP in the deciding result of said seventh step, and processing a TCP packet if the type of the packet is a TCP.

4. A record medium in an Internet edge router having a microprocessor, which is capable of being read through a computer having a record of a program, said medium characterized in that:
   said program is provided to realize,
   a first function of defining public network connection information in an option class of an Internet protocol message;
   a second function of constructing an SA module and an SA hierarchical protocol in a service terminal protocol in order to provide IP address information and a user authentication from a server having information of the existing public network subscribers by using the public network connection information, and constructing a connection information processing part to process the public network connection information; and
   a third function of receiving a message from a network interface and processing it, in the connection information processing part.

* * * * *